April 15, 1930.  O. H. GENTRY  1,754,887
SCOOTER
Filed Feb. 20, 1929

OLIVER H. GENTRY, Inventor

By Frank Keifer, Attorney

Patented Apr. 15, 1930

1,754,887

UNITED STATES PATENT OFFICE

OLIVER H. GENTRY, OF ROCHESTER, NEW YORK

SCOOTER

Application filed February 20, 1929. Serial No. 341,527.

The object of this invention is to provide a new and improved form of scooter in which the scooter can be propelled by one foot as is usually the case.

Another object of the invention is to simplify the driving mechanism by which the scooter is propelled by hand.

These and other objects of the invention will be illustrated in the drawings, described in the specification and pointed out in the claims at the end thereof.

In the drawing.

In the drawings like reference numerals indicate like parts.

Figure 4:
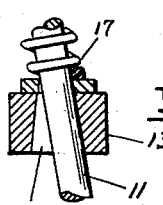
Fig. 4 is an enlarged sectional view of the cross head showing one of the links or connecting rods that work therein, the section being taken on the line $4^x$, $4^x$ of Fig. 2.

In the drawing reference numeral 1 indicates the platform and 2 indicates the rear wheel of the scooter, and 3 indicates the frame and steering head by which the front wheel 4 is carried. The platform 1 and the frame 3 are fastened together by a bearing 5 through the several parts of which passes the bolt 6 by which the three parts of the bearing are fastened together. The frame 3 is provided with a yoke 7 in which the front wheel 4 is mounted to rotate. The front wheel is keyed to an axle 8 and on each end of this axle outside of the fork 7 is provided the cranks 9 and 10 by which the axle 8 and wheel 4 are driven. Connected to each one of these cranks is a link 11 and 12. These links extend up to a cross head 13 carried on the frame 3. This cross head has tapered openings 14 therein as is shown in Fig. 4. The links 11 and 12 move up and down in this cross head as the wheel 4 rotates. At the top of each link is placed a handle 15 and 16 and between the handles and the cross head are placed the springs 17 and 18 which help to raise the handles from the lowest position and help to drive the scooter more uniformly. On top of the frame 3 is placed the steering handle 19, which handle is used for the purpose of steering the scooter or for the purpose of handling the scooter when the operator is not riding.

On each of the links 11 and 12 is provided a collar 21 and 22 which are adjustably fastened thereon to vary the pressure that is exerted on the spring when the cranks 9 and 10 are at the bottom of their movement.

That portion of the bearing 5 that is carried on the front head comprises two sleeves 23 and 24 which can be clamped on the steering head at any height so as to hold the platform at any height that may be desired. This helps to make the steering head more interchangeable with the various platforms of scooters that are now in use, so as to be coupled therewith.

It will be understood that the front wheel and frame and driving parts therefor will be specially made and will be used in connection with the platform 1 and the wheel 2 of any of the well known scooters that are now in use.

In the operation of this scooter the operator can have one foot on the platform and start the scooter with the other foot on the ground, and can hold on to the scooter by holding the handles 15 and 16. He will push down first on the one handle and then on the other by which operation the scooter is driven, and as each crank 9 and 10 passes over the center it will lift the link connected thereto and the expansion of the springs 17 and 18 will also help to lift the link and pull up on the crank in question so as to help drive the scooter. The muscular effort is all exerted on the downward thrust on each link which is sufficient to drive the scooter and compress the spring in each case. The expansion of the spring after the crank is passed over the center helps to drive the scooter and simplify the movements of the operator in that his hands are lifted by the links and he need therefore exert himself only on the downward thrust.

Figure 1:
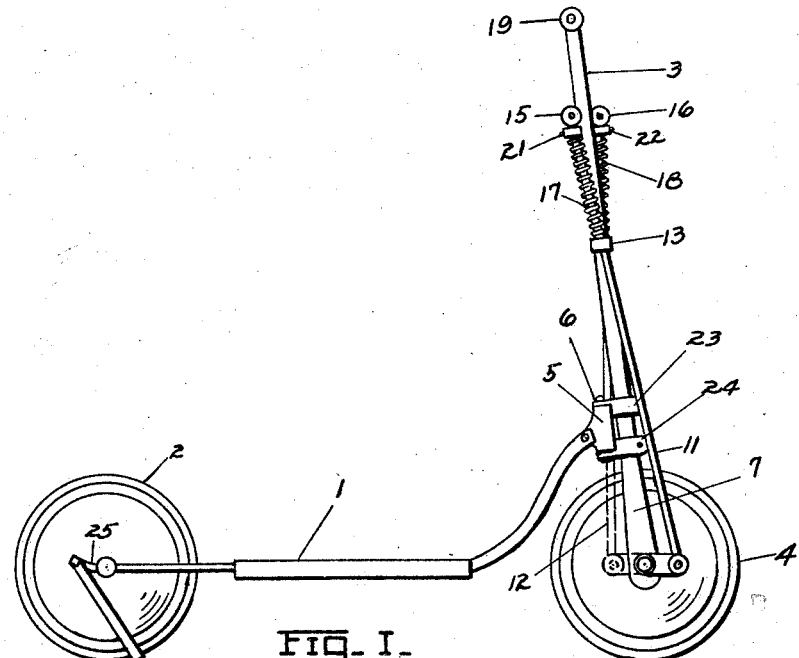
Fig. 1 is a side elevation of the scooter containing my improvement.
Figure 2:
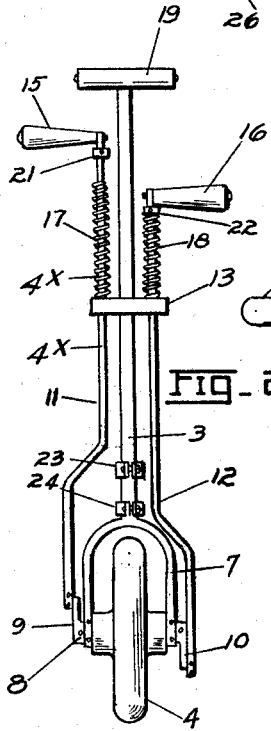
Fig. 2 is a front elevation of the scooter.
Figure 3:
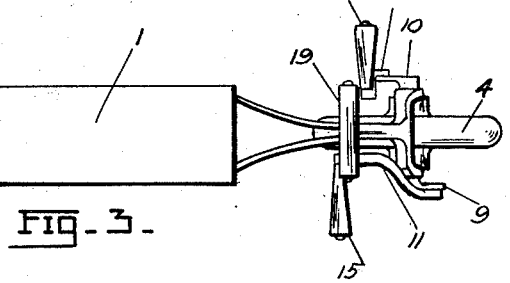
Fig. 3 is a top plan view of the scooter.

As shown in Fig. 1 the frame of the platform extends back of the axle of the wheel 2 and is provided with a bracket 25 on which is pivotally mounted a U shaped yoke 26 which when the scooter is at rest can be put in position shown in Fig. 1. When the scooter is driven this yoke can be thrown over 280 degrees and left to rest on the platform.

I claim:

1. In a scooter, a steering fork and steering head, a cross head on the steering head, a driving wheel and axle therefor mounted to turn in the fork, a crank on each end of the axle outside of the fork, a link connected to each crank, said links passing up through the cross head and having a sliding bearing therein, a handle at the upper end of each link by which the link may be driven, a collar on each link above the cross head, a spring between the collar and the cross head that is compressed on the downward movement of the link and by which the link is drawn up after its crank has passed over the center.

2. In a scooter, a steering fork and steering head, a cross head on the steering head, a driving wheel and axle therefor mounted to turn in the fork, a crank on each end of the axle outside of the fork, a link connected to each crank, said links passing up through the cross head and having a sliding bearing therein, a bearing adjustable up and down on said head and adapted to have the platform pivoted thereto.

In testimony whereof I affix my signature.

OLIVER H. GENTRY.